(12) United States Patent
Yamate et al.

(10) Patent No.: US 9,234,117 B2
(45) Date of Patent: *Jan. 12, 2016

(54) ORGANIC-INORGANIC COMPLEX AND COMPOSITION FOR FORMING SAME

(75) Inventors: Taiki Yamate, Ichihara (JP); Hiromoto Shibata, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/812,651

(22) PCT Filed: Aug. 4, 2011

(86) PCT No.: PCT/JP2011/004419
§ 371 (c)(1),
(2), (4) Date: Jan. 28, 2013

(87) PCT Pub. No.: WO2012/017660
PCT Pub. Date: Feb. 9, 2012

(65) Prior Publication Data
US 2013/0131245 A1    May 23, 2013

(30) Foreign Application Priority Data

Aug. 5, 2010    (JP) .................. 2010-176111

(51) Int. Cl.
| | |
|---|---|
| C08K 3/22 | (2006.01) |
| C08F 2/48 | (2006.01) |
| C08G 77/20 | (2006.01) |
| C09D 183/04 | (2006.01) |
| C09D 175/14 | (2006.01) |
| C08F 2/44 | (2006.01) |
| C08K 3/36 | (2006.01) |

(52) U.S. Cl.
CPC ............... *C09D 175/14* (2013.01); *C08F 2/44* (2013.01); *C08F 2/48* (2013.01); *C08G 77/20* (2013.01); *C09D 183/04* (2013.01); *C08K 3/36* (2013.01)

(58) Field of Classification Search
CPC ........ C09D 183/04; C08F 2/48; C08G 77/20; C08K 3/36
See application file for complete search history.

(56) References Cited

U.S. PATENT DOCUMENTS

| | | | |
|---|---|---|---|
| 6,699,918 B2 | 3/2004 | Ozai et al. | |
| 6,846,568 B2 * | 1/2005 | Yamaya et al. | 428/447 |
| 2002/0014090 A1 * | 2/2002 | Tsujino et al. | 65/17.2 |
| 2010/0036012 A1 * | 2/2010 | Kimura et al. | 522/172 |

FOREIGN PATENT DOCUMENTS

| | | |
|---|---|---|
| EP | 0 730 168 A2 | 9/1996 |
| EP | 1 849 835 A1 | 10/2007 |
| EP | 1 947 155 A1 | 7/2008 |
| EP | 2 161 126 A1 | 3/2010 |
| JP | 60044564 A * | 3/1985 |
| JP | 08012902 A * | 1/1996 |
| JP | A-10-102002 | 4/1998 |
| JP | A-10-195417 | 7/1998 |
| JP | A-2000-169755 | 6/2000 |
| JP | A-2000-336281 | 12/2000 |
| JP | A-2001-214092 | 8/2001 |
| JP | A-2002-234943 | 8/2002 |
| JP | A-2002-235018 | 8/2002 |
| JP | A-2002-363494 | 12/2002 |
| JP | A-2005-272702 | 10/2005 |
| JP | A-2007-207589 | 8/2007 |
| JP | A-2010-202860 | 9/2010 |
| WO | WO 2006/088079 A1 | 8/2006 |
| WO | WO 2008/069217 A1 | 6/2008 |

OTHER PUBLICATIONS

Derwent Abstract of JP 60-044564 (Acc No. 1985-096327, 1985).*
Machine translated English equivalent of JP 08-012902 (1996, 6 pages).*
Nov. 15, 2011 International Search Report issued in International Application No. PCT/JP2011/004419 (with translation).
Mar. 12, 2013 International Preliminary Report on Patentability issued in International Application No. PCT/JP2011/004419.
Jun. 24, 2015 Extended European Search Report issued in European Application No. 11814295.9.

* cited by examiner

Primary Examiner — Brieann R Fink
(74) Attorney, Agent, or Firm — Oliff PLC

(57) ABSTRACT

An organic-inorganic complex having high surface hardness and anti-Newton ring properties, having a low haze factor, being capable of preventing glare, and being further capable of also having anti-glare properties. The organic-inorganic complex of the present invention is made using an organic-inorganic complex-forming composition containing the following components a) to d): a) an organic silicon compound represented by formula (I): $R_nSiX_{4-n}$, and/or a condensate thereof; b) a silanol condensation catalyst; c) an electromagnetic ray-curable compound; and d) metal compound particles that are a mixture of metal compound particles having an isoelectric point of less than 5 as a metal oxide and metal compound particles having an isoelectric point of 5 or more as a metal oxide.

11 Claims, No Drawings

ORGANIC-INORGANIC COMPLEX AND COMPOSITION FOR FORMING SAME

TECHNICAL FIELD

The present invention relates to an organic-inorganic complex containing metal compound particles, and a composition for forming the same, and particularly to an organic-inorganic complex in which the carbon content on the surface side is lower than the carbon content inside and the surface is inorganic, the organic-inorganic complex having unevenness on the surface by further containing metal compound particles, and a composition for forming the same. The metal compound particle-containing organic-inorganic complex of the present invention is preferably used as anti-Newton ring films in touch panels and various display screens.

This application claims priority to Japanese Patent Application No. 2010-176111 filed on Aug. 5, 2010, the content of which is incorporated herein.

BACKGROUND ART

Currently, as a raw material of a commercial silane-based coating agent, a trifunctional silane is mainly used, and a polysiloxane having moderate hardness and flexibility is formed by such a trifunctional silane. However, the hard coating properties of a film of a trifunctional silane are not sufficient. Therefore, the trifunctional silane is mixed with a tetrafunctional silane and colloidal silica to compensate for the hard coating properties. But, a problem is that if the film is hardened, the film cracks easily, and the adhesiveness worsens.

Silane-based coating agents include antifouling film-forming compositions containing a trifunctional alkoxysilane compound having an epoxy group (for example, see Patent Document 1). In addition, silane-based coating agents containing a photocatalyst are also proposed, and the film is cured using a photo-acid-generating agent, a crosslinking agent, a curing catalyst, or the like (for example, see Patent Documents 2 and 3). Further, silane-based organic-inorganic complex gradient materials having a component gradient structure in which the content of the metal-based compound in the material changes continuously in the depth direction from the surface of the material are also proposed (for example, see Patent Document 4).

The inventors have provided an organic-inorganic complex in which the surface has very high hardness and the inside and the back surface side have appropriate hardness and which has excellent adhesiveness to a substrate, by irradiating an organic silicon compound with ultraviolet rays in the presence of a photosensitive compound (see Patent Document 5). However, a further improvement has been desired in adhesiveness to a base material and moisture resistance.

On the other hand, for hard coating films, the use of acrylate-based resins or the like as UV-curable resins is known. For example, Patent Document 6 describes a hard coating film containing a (meth)acrylate mixture (A), a photopolymerization initiator (B), an ethylenic unsaturated group-containing urethane oligomer (C), a colloidal silica sol (D), and a diluent (E), and describes that the obtained film has good pencil hardness, curl, and adhesiveness to a base material.

In addition, Patent Document 7 describes the use of a curable composition containing (A) particles obtained by bonding particles of an oxide of at least one element selected from the group consisting of silicon, aluminum, zirconium, titanium, zinc, germanium, indium, tin, antimony, and cerium to an organic compound comprising a polymerizable unsaturated group, (B) a compound having a urethane bond and two or more polymerizable unsaturated groups in the molecule, and (C) a photopolymerization initiator, and describes that the curable composition has excellent coating properties and can form on the surfaces of various base materials a coating film (coating) having high hardness and a high refractive index and having excellent abrasion resistance and excellent adhesiveness to base materials and low refractive index layers.

Further, Patent Document 8 describes an ultraviolet-curable hard coating resin composition obtained by blending (A) a mixture of a hydrolysate of an organic silicon compound and metal oxide fine particles, (B) a polyfunctional acrylate or methacrylate, and (C) a photopolymerization initiator, and describes that the bleeding of the antistatic agent on the surface, a decrease in transparency, a deterioration in moisture resistance, and the like can be kept within practically allowable ranges, and functions (abrasion resistance, surface hardness, moisture resistance, solvent and chemical resistance, and the like) as a hard coating are satisfied.

However, these hard coating films using acrylate-based resins and the like have poorer wear resistance than inorganic films, and therefore, a metal oxide sol having high hardness is added for improvement. But, in this method, the surfaces of the metal oxide particles are covered with a large amount of the resin, and a sufficient effect cannot always be expected. Particularly, in the case of anti-Newton ring films that contain metal oxide particles having a large particle diameter to form unevenness on the surfaces of the films, a problem is that unless the surfaces of the metal oxide particles are covered with the resin, the metal oxide particles having a large particle diameter fall off in a wear test.

For these problems, the inventors have already found that an organic-inorganic complex in which the surface has very high hardness and which has excellent adhesiveness to a substrate and excellent moisture resistance can be produced by blending an ultraviolet-curable compound into a polysiloxane-based organic-inorganic complex (Patent Document 9). However, the light reflection properties of the above organic-inorganic complex have not been studied.

Therefore, the inventors have developed an organic-inorganic complex in which the ten-point average roughness of the organic-inorganic complex surface is 0.1 µm to 5 µm by using metal oxide particles having a primary particle diameter of 0.05 µm to 0.2 µm (Patent Document 10). The performance as an anti-Newton ring film has been sufficient, but the new problem of an increase in haze factor has arisen by providing unevenness by the particles having a large particle diameter.

PRIOR ART DOCUMENTS

Patent Documents

Patent Document 1: Japanese unexamined Patent Application Publication No. 10-195417
Patent Document 2: Japanese unexamined Patent Application Publication No. 2002-363494
Patent Document 3: Japanese unexamined Patent Application Publication No. 2000-169755
Patent Document 4: Japanese unexamined Patent Application Publication No. 2000-336281
Patent Document 5: WO2006/088079
Patent Document 6: Japanese unexamined Patent Application Publication No. 2002-235018
Patent Document 7: Japanese unexamined Patent Application Publication No. 2005-272702

Patent Document 8: Japanese unexamined Patent Application Publication No. 2001-214092
Patent Document 9: WO2008/069217
Patent Document 10: Japanese Patent Application No. 2010-6134

SUMMARY OF THE INVENTION

Object to be Solved by the Invention

It is an object of the present invention to provide anti-Newton ring properties to a polysiloxane-based organic-inorganic complex in which the surface has higher hardness than the inside, to provide an organic-inorganic complex that has both high surface hardness and a low haze factor, can further prevent glare, and can also be provided with anti-glare properties.

Means to Solve the Object

The present inventors have addressed the above object and studied diligently, and, as a result, found that an excellent organic-inorganic complex in which the surface has very high hardness and which simultaneously has excellent anti-Newton ring properties, can prevent glare, has a low haze factor, and can further also be provided with anti-glare properties can be produced by containing a mixture of two types of metal compound particles having certain particular isoelectric points in an organic-inorganic complex in which a polysiloxane-based organic-inorganic complex and an electromagnetic ray-curable compound are blended, leading to the completion of the present invention.

Specifically, the present invention relates to
(1) an organic-inorganic complex-forming composition comprising:
a) at least one organic silicon compound represented by formula (I):

$$R_nSiX_{4-n} \tag{I}$$

(wherein R represents an organic group having a carbon atom directly bonded to Si, and X represents a hydroxyl group or a hydrolyzable group; and n represents 1 or 2, R may be the same or different when n is 2, and each X may be the same or different when (4−n) is 2 or more), and/or a condensate thereof;
b) a silanol condensation catalyst;
c) an electromagnetic ray-curable compound; and
d) metal compound particles that are a mixture of metal compound particles having an isoelectric point of less than 5 as a metal oxide and metal compound particles having an isoelectric point of 5 or more as a metal oxide,
(2) the organic-inorganic complex-forming composition according to (1), wherein the silanol condensation catalyst is at least one photosensitive compound sensitive to light having a wavelength of 350 nm or less, selected from the group consisting of a metal chelate compound, an organic acid metal salt compound, a metal compound having two or more hydroxyl groups or hydrolyzable groups, hydrolysates thereof, and condensates thereof, and/or a compound derived therefrom,
(3) the organic-inorganic complex-forming composition according to (2), wherein a metal in the silanol condensation catalyst is at least one selected from the group consisting of Ti, Al, Zr, and Sn,
(4) the organic-inorganic complex-forming composition according to (1), wherein the electromagnetic ray-curable compound is 2 to 98% by mass based on a total mass of the organic silicon compound and/or the condensate thereof, the silanol condensation catalyst, the electromagnetic ray-curable compound, and the metal compound particles,
(5) the organic-inorganic complex-forming composition according to (1), wherein a metal of the metal compound particles having an isoelectric point of less than 5 as a metal oxide is silicon,
(6) the organic-inorganic complex-forming composition according to (1), wherein the metal compound particles having an isoelectric point of less than 5 as a metal oxide are silica,
(7) the organic-inorganic complex-forming composition according to (1), wherein a metal of the metal compound particles having an isoelectric point of 5 or more as a metal oxide is at least one selected from the group consisting of Zr, Al, Ti, and Mg,
(8) the organic-inorganic complex-forming composition according to (1), wherein the metal compound particles having an isoelectric point of 5 or more as a metal oxide are at least one selected from the group consisting of zirconia, alumina, titania, and magnesium fluoride,
(9) the organic-inorganic complex-forming composition according to (1), wherein an average particle diameter of primary particles of the metal compound particles having an isoelectric point of less than 5 as a metal oxide and/or the metal compound particles having an isoelectric point of 5 or more as a metal oxide is in the range of 1 to 100 nm, and
(10) the organic-inorganic complex-forming composition according to (1), wherein the metal compound particles are in a sol state.

In addition, the present invention relates to
(11) an organic-inorganic complex comprising:
a) a condensate of at least one organic silicon compound represented by formula (I):

$$R_nSiX_{4-n} \tag{I}$$

(wherein R represents an organic group having a carbon atom directly bonded to Si, and X represents a hydroxyl group or a hydrolyzable group; and n represents 1 or 2, R may be the same or different when n is 2, and each X may be the same or different when (4−n) is 2 or more);
b) a silanol condensation catalyst;
c) a cured product of an electromagnetic ray-curable compound; and
d) an aggregate of metal compound particles that are a mixture of metal compound particles having an isoelectric point of less than 5 as a metal oxide and metal compound particles having an isoelectric point of 5 or more as a metal oxide,
(12) the organic-inorganic complex according to (11), wherein the silanol condensation catalyst is at least one photosensitive compound sensitive to light having a wavelength of 350 nm or less, selected from the group consisting of a metal chelate compound, an organic acid metal salt compound, a metal compound having two or more hydroxyl groups or hydrolyzable groups, hydrolysates thereof, and condensates thereof, and/or a compound derived therefrom,
(13) the organic-inorganic complex according to (11), wherein a metal in the silanol condensation catalyst is at least one selected from the group consisting of Ti, Al, Zr, and Sn,
(14) the organic-inorganic complex according to (11), wherein the cured product of the electromagnetic ray-curable compound is 2 to 98% by mass based on a total mass of the condensate of the organic silicon compound, the silanol condensation catalyst, the cured product of the electromagnetic ray-curable compound, and the metal compound particles,

(15) the organic-inorganic complex according to (11), wherein a metal of the metal compound fine particles having an isoelectric point of less than 5 as a metal oxide is silicon,
(16) the organic-inorganic complex according to (11), wherein the metal compound particles having an isoelectric point of less than 5 as a metal oxide are silica,
(17) the organic-inorganic complex according to (11), wherein a metal of the metal compound particles having an isoelectric point of 5 or more as a metal oxide are at least one selected from the group consisting of Zr, Al, Ti, and Mg,
(18) the organic-inorganic complex according to (11), wherein the metal compound particles having an isoelectric point of 5 or more as a metal oxide is at least one selected from the group consisting of zirconia, alumina, titania, and magnesium fluoride,
(19) the organic-inorganic complex according to (11), wherein an average particle diameter of a primary particle of the metal compound particles having an isoelectric point of less than 5 as a metal oxide and/or the metal compound particles having an isoelectric point of 5 or more as a metal oxide is in the range of 1 to 100 nm,
(20) the organic-inorganic complex according to any one of (11) to (19) of which haze factor is 5% or less when formed on a substrate, and
(21) a laminate obtained by applying an organic-inorganic complex-forming composition according to any one of (1) to (10) to a substrate.

Mode of Carrying Out the Invention

Organic-Inorganic Complex-Forming Composition

The organic-inorganic complex-forming composition of the present invention comprises:
a) at least one organic silicon compound represented by formula (I):

$$R_n SiX_{4-n} \qquad (I)$$

(wherein R represents an organic group having a carbon atom directly bonded to Si, and x represents a hydroxyl group or a hydrolyzable group; and n represents 1 or 2, R may be the same or different when n is 2, and X may be the same or different when (4−n) is 2 or more) (hereinafter sometimes simply referred to as an organic silicon compound), and/or a condensate thereof;
b) a silanol condensation catalyst;
c) an electromagnetic ray-curable compound; and
d) metal compound particles that are a mixture of metal compound particles having an isoelectric point of less than 5 as a metal oxide and metal compound particles having an isoelectric point of 5 or more as a metal oxide.

The solids (the organic silicon component, the silanol condensation catalyst, the electromagnetic ray-curable compound, and the metal compound particles) in the organic-inorganic complex-forming composition of the present invention are preferably 1 to 75% by mass, more preferably 10 to 60% by mass.
(Organic Silicon Compound)
In the formula (I) of the organic silicon compound of the present invention, R and X are each as follows.
R represents an organic group having a carbon atom directly bonded to Si. Examples of such an organic group can include unsubstituted or substituted hydrocarbon groups, and groups consisting of polymers of unsubstituted or substituted hydrocarbons. Specific examples include unsubstituted or substituted hydrocarbon groups having 1 to 30 carbon atoms. Unsubstituted or substituted straight chain or branched chain alkyl groups having 1 to 10 carbon atoms, alkyl groups having a chain longer than 10 carbon atoms, unsubstituted or substituted cycloalkyl groups having 3 to 8 carbon atoms, unsubstituted or substituted straight chain or branched chain alkenyl groups having 2 to 10 carbon atoms, or unsubstituted or substituted cycloalkenyl groups having 3 to 8 carbon atoms are preferred. In addition, the organic group may be a hydrocarbon group having an aromatic ring.

In addition, such an organic group may comprise an oxygen atom, a nitrogen atom, or a silicon atom, and may be a group comprising a polymer such as a polysiloxane, a polyvinylsilane, or a polyacrylsilane. Examples of the substituent can include halogens and a methacryloxy group. Examples of the halogens include a fluorine atom, a chlorine atom, a bromine atom, and an iodine atom.

Alkyl groups having 1 to 10 carbon atoms include straight chain or branched chain alkyl groups having 1 to 10 carbon atoms. Examples of the alkyl groups having 1 to 10 carbon atoms include a methyl group, an ethyl group, a n-propyl group, an isopropyl group, a n-butyl group, an isobutyl group, a s-butyl group, a t-butyl group, a n-pentyl group, an isopentyl group, a neopentyl group, a 2-methylbutyl group, a 2,2-dimethylpropyl group, a n-hexyl group, an isohexyl group, a n-heptyl group, a n-octyl group, a nonyl group, an isononyl group, and a decyl group. Examples of the alkyl groups having a chain longer than 10 carbon atoms include a lauryl group, a tridecyl group, a myristyl group, a pentadecyl group, a palmityl group, a heptadecyl group, and a stearyl group.

Examples of the cycloalkyl groups having 3 to 8 carbon atoms include a cyclopropyl group, a cyclobutyl group, a cyclopentyl group, a cyclohexyl group, a cycloheptyl group, and a cyclooctyl group.

The straight chain or branched chain alkenyl groups having 2 to 10 carbon atoms mean straight chain or branched chain alkenyl groups having 2 to 10 carbon atoms that have a carbon-carbon double bond at any one or more sites. Examples of the straight chain or branched chain alkenyl groups having 2 to 10 carbon atoms include an ethenyl group, a prop-1-en-1-yl group, a prop-2-en-1-yl group, a prop-1-en-2-yl group, a but-1-en-1-yl group, a but-2-en-1-yl group, a but-3-en-1-yl group, a but-1-en-2-yl group, a but-3-en-2-yl group, a pent-1-en-1-yl group, a pent-4-en-1-yl group, a pent-1-en-2-yl group, a pent-4-en-2-yl group, a 3-methyl-but-1-en-1-yl group, a hex-1-en-1-yl group, a hex-5-en-1-yl group, a hept-1-en-1-yl group, a hept-6-en-1-yl group, an act-1-en-1-yl group, and an oct-1-en-1-yl group.

The cycloalkenyl groups having 3 to 8 carbon atoms mean alkenyl groups having 3 to 8 carbon atoms that have a carbon-carbon double bond at any one or more sites and have a cyclic moiety. Examples of the cycloalkenyl groups having 3 to 8 carbon atoms include a 1-cyclopenten-1-yl group, a 2-cyclopenten-1-yl group, a 1-cyclohexen-1-yl group, a 2-cyclohexen-1-yl group, and a 3-cyclohexen-1-yl group.

The hydrocarbon groups having an aromatic ring include $C_{6-10}$ aryl $C_{1-8}$ alkyl groups and $C_{6-10}$ aryl $C_{2-6}$ alkenyl groups. Examples of the $C_{6-10}$ aryl $C_{1-8}$ alkyl groups include a benzyl group, a phenethyl group, a 3-phenyl-n-propyl group, a 4-phenyl-n-butyl group, a 5-phenyl-n-pentyl group, a 8-phenyl-n-octyl group, and a naphthylmethyl group. Examples of the $C_{6-10}$ aryl $C_{2-6}$ alkenyl groups include a styryl group, a 3-phenyl-prop-1-en-1-yl group, a 3-phenyl-prop-2-en-1-yl group, a 4-phenyl-but-1-en-1-yl group, a 4-phenyl-but-3-en-1-yl group, a 5-phenyl-pent-1-en-1-yl group, a 5-phenyl-pent-4-en-1-yl group, a 8-phenyl-oct-1-en-1-yl group, a 8-phenyl-oct-7-en-1-yl group, and a naphthylethenyl group.

Examples of the groups having an oxygen atom include groups having an oxirane ring (epoxy group), such as an epoxy group, epoxyalkyl groups, and a glycidoxypropyl group, an acryloxymethyl group, and a methacryloxymethyl group.

As the epoxyalkyl groups among the groups having an oxygen atom, straight chain or branched chain epoxyalkyl groups having 3 to 10 carbon atoms are preferred. Examples of the epoxyalkyl groups include an epoxymethyl group, an epoxyethyl group, an epoxy-n-propyl group, an epoxyisopropyl group, an epoxy-n-butyl group, an epoxyisobutyl group, an epoxy-t-butyl group, an epoxy-n-pentyl group, an epoxyisopentyl group, an epoxyneopentyl group, an epoxy-2-methylbutyl group, an epoxy-2,2-dimethylpropyl group, and an epoxy-n-hexyl group. Examples of groups further having an oxygen atom in addition to an oxirane ring include a glycidoxypropyl group.

As the groups having a nitrogen atom, groups having —NR'$_2$ (wherein R' represents a hydrogen atom, an alkyl group, or an aryl group, and R' may be the same as or different from each other) or groups having —N=CR''$_2$ (wherein R'' represents a hydrogen atom or an alkyl group, and each R'' may be the same as or different from each other) are preferred. Examples of the alkyl group include the same ones as the above. Examples of the aryl group include a phenyl group, a naphthyl group, an anthracen-1-yl group, and a phenanthren-1-yl group.

Examples of the groups having —NR'$_2$ include a —CH$_2$—NH$_2$ group, a —C$_3$H$_6$—NH$_2$ group, and a —CH$_3$—NH—CH$_3$ group. Examples of the groups having —N=CR''$_2$ include a —CH$_2$—N=CH—CH$_3$ group, a —CH$_2$—N=C(CH$_3$)$_2$ group, and a —C$_2$H$_5$—N=CH—CH$_3$ group.

Among the above, examples of groups decomposed by irradiation with light having a wavelength of 350 nm or less include groups having a vinyl group, groups having an oxirane ring, groups having —NR'$_2$ (wherein R' represents a hydrogen atom, an alkyl group, or an aryl group, and R' may be the same as or different from each other), or groups having —N=CR''$_2$ (wherein R'' represents a hydrogen atom or an alkyl group, and each R'' may be the same as or different from each other).

Here, examples of the groups having a vinyl group include groups having groups having alkenyl groups, such as an ethenyl group (vinyl group), a prop-2-en-1-yl group, a but-3-en-1-yl group, a pent-4-en-1-yl group, a hex-5-en-1-yl group, a hept-6-en-1-yl group, and an act-7-en-1-yl group, vinylcarbonyl groups, such as a methacrylmethyl group, an acryloxymethyl group, and a methacryloxymethyl group, or the like. The groups having an oxirane ring, the groups having —NR'$_2$, and the groups having —N=CR''$_2$ are as described above.

In addition, in the formula (I) of the organic silicon compound, n represents 1 or 2, and n=1 is particularly preferred. When n is 2, R may be the same or different. In addition, one of these can be used alone, or two or more of these can be used in combination.

X represents a hydroxyl group or a hydrolyzable group. When (4−n) in formula (I) is 2 or more, X may be the same or different. The hydrolyzable group means, for example, a group that can be hydrolyzed by heating at 25° C. to 100° C. in the coexistence of excess water without a catalyst to produce a silanol group, or a group that can form a siloxane condensate. Specific examples of the hydrolyzable group can include alkoxy groups, acyloxy groups, halogen groups, and isocyanate groups. Alkoxy groups having 1 to 4 carbon atoms, or acyloxy groups having 1 to 6 carbon atoms are preferred.

Examples of the alkoxy groups having 1 to 4 carbon atoms include a methoxy group, an ethoxy group, a n-propoxy group, an isopropyloxy group, a n-butoxy group, an isobutoxy group, and a t-butoxy group. Examples of the acyloxy groups having 1 to 6 carbon atoms include an acetyloxy group and a benzoyloxy group. Examples of the halogens include a fluorine atom, a chlorine atom, a bromine atom, and an iodine atom.

Specific examples of the organic silicon compounds can include methyltrichlorosilane, methyltrimethoxysilane, methyltriethoxysilane, methyltri(n-butoxy)silane, ethyltrimethoxysilane, ethyltriisopropoxysilane, ethyltri(n-butoxy)silane, n-butyltrimethoxysilane, pentafluorophenyltrimethoxysilane, phenyltrimethoxysilane, nonafluoro-n-butylethyldimethoxysilane, trifluoromethyltrimethoxysilane, dimethyldiaminosilane, dimethyldichlorosilane, dimethyldiacetoxysilane, dimethyldimethoxysilane, diphenyldimethoxysilane, di(n-butyl)dimethoxysilane, vinyltrimethoxysilane, 3-(meth)acryloxy-n-propyltrimethoxysilane, 3-(3-methyl-3-oxetanemethoxy)-n-propyltrimethoxysilane, oxacyclohexyltrimethoxysilane, methyltri(meth)acryloxysilane, methyltris[2-(meth)acryloxyethoxy]silane, methyltriglycidyloxysilane, methyltris(3-methyl-3-oxetanemethoxy)silane, vinyltrichlorosilane, vinyltriethoxysilane, 2-(3,4-epoxycyclohexyl)ethyltrimethoxysilane, 3-glycidyloxy-n-propyltrimethoxysilane, 3-glycidyloxy-n-propylmethyldiethoxysilane, 3-glycidyloxy-n-propyltriethoxysilane, p-styryltrimethoxysilane, 3-methacryloxy-n-propylmethyldimethoxysilane, 3-methacryloxy-n-propyltrimethoxysilane, 3-methacryloxy-n-propylmethyldiethoxysilane, 3-methacryloxy-n-propyltriethoxysilane, 3-acryloxy-n-propyltrimethoxysilane, N-(2-aminoethyl)-3-amino-n-propylmethyldimethoxysilane, N-(2-aminoethyl)-3-amino-n-propyltrimethoxysilane, N-(2-aminoethyl)-3-amino-n-propyltriethoxysilane, 3-amino-n-propyltrimethoxysilane, 3-amino-n-propyltriethoxysilane, N-(1,3-dimethyl-butylidene)-3-amino-n-propyltriethoxysilane, and N-phenyl-3-amino-n-propyltrimethoxysilane. One of these can be used alone, or two or more of these can be used in combination.

In addition, examples of the organic silicon compounds having a group consisting of a polymer of a hydrocarbon can include (meth)acrylates, such as methyl (meth)acrylate, ethyl (meth)acrylate, butyl (meth)acrylate, 2-ethylhexyl (meth)acrylate, and cyclohexyl (meth)acrylate; carboxylic acids, such as (meth)acrylic acid, itaconic acid, and fumaric acid, and acid anhydrides, such as maleic anhydride; epoxy compounds, such as glycidyl (meth)acrylate; amino compounds, such as diethylaminoethyl (meth)acrylate and aminoethyl vinyl ether; amide compounds, such as (meth)acrylamide, itaconic acid diamide, α-ethylacrylamide, crotonamide, fumaric acid diamide, maleic acid diamide, and N-butoxymethyl(meth)acrylamide; and organic silicon compounds comprising as the R component in formula (I) a vinyl-based polymer obtained by copolymerizing a vinyl-based compound selected from acrylonitrile, styrene, α-methylstyrene, vinyl chloride, vinyl acetate, vinyl propionate, and the like.

The organic silicon compound used is preferably a condensate, and its average particle diameter is preferably 50 nm or less, more preferably 20 nm or less.

The amount of the organic silicon compound and/or the condensate thereof in the solids of the organic-inorganic complex-forming composition of the present invention is 1 to 95% by mass, preferably 1 to 50% by mass, based on the total mass of the organic silicon compound and/or the condensate thereof, the silanol condensation catalyst, the electromagnetic ray-curable compound, and the metal compound particles.

(Silanol Condensation Catalyst)

The silanol condensation catalyst is not particularly limited as long as it hydrolyzes the hydrolyzable group in the compound represented by formula (I), and condenses the silanol to form a siloxane bond. Examples of the silanol condensation catalyst include at least one selected from the group consisting of organic metals, organic acid metal salts, acids, bases, metal chelate compounds, and hydrolysates thereof, and condensates thereof. One silanol condensation catalyst can be used alone, or two or more silanol condensation catalysts can be used in combination.

Examples of the organic metals include alkyl metal compounds, such as tetramethyltitanium and tetrapropylzirconium, and metal alcoholates, such as tetraisopropoxytitanium and tetrabutoxyzirconium.

Examples of the organic acid metal salts include metal carboxylates, metal sulfonates, and phenol metal salts.

Examples of the metal chelate compounds include metal chelate compounds with β-ketocarbonyl compounds, β-ketoester compounds, α-hydroxyester compounds, or the like.

Examples of the acids include organic acids and mineral acids. Specific examples of the organic acids include acetic acid, formic acid, oxalic acid, carbonic acid, phthalic acid, trifluoroacetic acid, p-toluenesulfonic acid, and methanesulfonic acid. Specific examples of the mineral acids include hydrochloric acid, nitric acid, boric acid, and hydrofluoboric acid.

Here, the acids encompass photo-acid-generating agents that generate an acid by light irradiation, specifically, diphenyliodonium hexafluorophosphate, triphenylphosphonium hexafluorophosphate, and the like.

Examples of the bases include strong bases, such as tetramethylguanidine and tetramethylguanidylpropyltrimethoxysilane; organic amines, carboxylic acid-neutralized salts of organic amines, and quaternary ammonium salts.

Among these, particularly, photosensitive compounds that can remove the carbon component on the surface side by the action of light having a wavelength of 350 nm or less are preferred.

The photosensitive compounds are compounds that can remove the carbon component on the surface side by the action of light having a wavelength of 350 nm or less, irradiated from the surface side, regardless of their mechanisms, preferably, compounds that can set the carbon content of a surface portion at 2 nm from the surface in the depth direction to 80% or less, more preferably 2 to 60%, and further preferably 2 to 40%, of the carbon content of a portion in which the amount of carbon does not decrease (in the case of a film, for example, a back surface portion at 10 nm from the back surface of the film in the depth direction). The photosensitive compounds particularly preferably refer to compounds that can remove the carbon component to a predetermined depth so that the amount of the carbon component removed decreases gradually from the surface side, that is, compounds that can form a layer in which the carbon content increases gradually from the surface to a predetermined depth. Specific examples of the photosensitive compounds can include compounds that absorb light having a wavelength of 350 nm or less and are excited.

Here, the light having a wavelength of 350 nm or less means light obtained using a source of light comprising light having any wavelength of 350 nm or less as a component, preferably, light obtained using a source of light comprising light having any wavelength of 350 nm or less as the main component, that is, light obtained using a source of light in which the wavelength of a component in the largest amount is 350 nm or less.

The photosensitive compound and/or a derivative thereof is preferably at least one compound selected from the group consisting of metal chelate compounds, organic acid metal salts, metal compounds having two or more hydroxyl groups or hydrolyzable groups (excluding metal chelate compounds and organic acid metal salts), hydrolysates thereof, and condensates thereof, particularly preferably a hydrolysate and/or a condensate, and especially preferably a hydrolysate and/or condensate of a metal chelate compound. Such a photosensitive compound and/or a derivative thereof may be chemically bonded to the organic silicon compound as described above, may be dispersed in a non-bonded state, or may be in a mixed state thereof. For the derivative of the photosensitive compound, specifically, further hydrolysates or condensates of hydrolysates or condensates of metal chelate compounds, organic acid metal salts, or metal compounds having two or more hydroxyl groups or hydrolyzable groups, or the like can be illustrated.

The above metal chelate compounds are preferably metal chelate compounds having a hydroxyl group or a hydrolyzable group, more preferably metal chelate compounds having two or more hydroxyl groups or hydrolyzable groups. Having two or more hydroxyl groups or hydrolyzable groups means that the total of hydrolyzable groups and hydroxyl groups is 2 or more. In addition, as the above metal chelate compounds, β-ketocarbonyl compounds, β-ketoester compounds, and α-hydroxyester compounds are preferred. Specific examples of the above metal chelate compounds include β-ketoesters, such as methyl acetoacetate, n-propyl acetoacetate, isopropyl acetoacetate, n-butyl acetoacetate, sec-butyl acetoacetate, and t-butyl acetoacetate; β-diketones, such as acetylacetone, hexane-2,4-dione, heptane-2,4-dione, heptane-3,5-dione, octane-2,4-dione, nonane-2,4-dione, and 5-methyl-hexane-2,4-dione; and compounds in which hydroxycarboxylic acids, such as glycolic acid and lactic acid, or the like are coordinated.

The above organic acid metal salts are compounds consisting of salts obtained from metal ions and organic acids. Examples of the organic acids include organic compounds that exhibit acidity, such as carboxylic acids, such as acetic acid, oxalic acid, tartaric acid, and benzoic acid; sulfur-containing organic acids, such as sulfonic acid and sulfinic acid; phenol compounds; enol compounds; oxime compounds; imide compounds; and aromatic sulfonamides.

In addition, the above metal compounds having two or more hydroxyl groups or hydrolyzable groups are those other than the above metal chelate compounds and organic acid metal salts. Examples of the above metal compounds having two or more hydroxyl groups or hydrolyzable groups can include metal hydroxides, and metal alcoholates such as metal n-propoxides, metal isopropoxides, and metal n-butoxides.

Examples of the hydrolyzable groups in the above metal compounds, the above metal chelate compounds, or the above organic acid metal salts include alkoxy groups, acyloxy groups, halogen groups, and isocyanate groups. Alkoxy groups having 1 to 4 carbon atoms and acyloxy groups having 1 to 4 carbon atoms are preferred. Having two or more hydroxyl groups or hydrolyzable groups means that the total of hydrolyzable groups and hydroxyl groups is 2 or more.

The hydrolysate and/or condensate of such a metal compound is preferably one obtained by hydrolyzing 1 mole of the metal compound having two or more hydroxyl groups or hydrolyzable groups, using 0.5 moles or more of water, more preferably one obtained by hydrolyzing 1 mole of the metal compound having two or more hydroxyl groups or hydrolyzable groups, using 0.5 to 2 moles of water.

In addition, the hydrolysate and/or condensate of the metal chelate compound is preferably one obtained by hydrolyzing 1 mole of the metal chelate compound using 5 to 100 moles of water, more preferably one obtained by hydrolyzing 1 mole of the metal chelate compound using 5 to 20 moles of water.

In addition, the hydrolysate and/or condensate of the organic acid metal salt is preferably one obtained by hydrolyzing 1 mole of the metal organic acid salt using 5 to 100 moles of water, more preferably one obtained by hydrolyzing 1 mole of the metal organic acid salt using 5 to 20 moles of water.

In the present invention, when two or more silanol condensation catalysts are used, the above compound having photosensitivity may or may not be contained. In addition, the compound having photosensitivity and a compound having no photosensitivity can be used in combination.

In addition, examples of metals in these metal compounds, metal chelate compounds, or organic acid metal salt compounds include titanium (Ti), zirconium (Zr), aluminum (Al), silicon (Si), germanium (Ge), indium (In), tin (Sn), tantalum (Ta), zinc (Zn), tungsten (W), and lead (Pb). Among these, titanium (Ti), zirconium (Zr), aluminum (Al), and tin (Sn) are preferred, and particularly, titanium (Ti) is preferred. One of these may be used alone, or two or more of these can also be used.

The silanol condensation catalyst, such as the photosensitive compound, used in the present invention is preferably a hydrolysate and/or a condensate, particularly preferably a hydrolysate and/or condensate of a metal chelate compound, and its average particle diameter is preferably 20 nm or less, more preferably 10 nm or less. Thus, the transparency of the organic-inorganic complex (organic-inorganic complex-based thin film) can be improved.

The blending ratio of the silanol condensation catalyst in the organic-inorganic complex-forming composition of the present invention is 1:99 to 99:1, preferably 1:99 to 50:50, based on the mass of the organic silicon compound and/or the condensate thereof. In addition, in a case where the photosensitive compound is contained as the silanol condensation catalyst, for the content of the photosensitive compound, the metal atoms in the photosensitive compound are in the range of 0.01 to 0.5 molar equivalents, preferably 0.05 to 0.2 molar equivalents, based on Si in the organic silicon compound, though depending on the type of the photosensitive compound.

(Electromagnetic Ray-Curable Compound)

The electromagnetic ray-curable compound of the present invention means a compound or a resin having a functional group that undergoes a polymerization reaction by irradiation with electromagnetic rays in the presence of a photopolymerization initiator. As the electromagnetic rays used, ultraviolet-rays, X-rays, radiation, ionizing radiation, and ionizing radiation ($\alpha$, $\beta$, and $\gamma$-rays, neutron beams, and electron beams) can be used, and light including a wavelength of 350 nm or less is preferred.

The irradiation with electromagnetic rays can be performed using a known apparatus such as an ultrahigh pressure mercury lamp, a high pressure mercury lamp, a low pressure mercury lamp, a metal halide lamp, an excimer lamp, a carbon arc lamp, or a xenon arc lamp. The source of light for irradiation is preferably a source of light comprising light having any wavelength in the range of 150 to 350 nm, more preferably a source of light comprising light having any wavelength in the range of 250 to 310 nm.

In addition, the amount of irradiation light of light for irradiation for sufficiently curing the organic-inorganic complex material layer is, for example, about 0.1 to 100 J/cm$^2$, and is preferably about 1 to 10 J/cm$^2$, more preferably about 1 to 5 J/cm$^2$, considering film curing efficiency (the relationship between irradiation energy and the extent of film curing).

As the electromagnetic ray-curable compound, specifically, (meth)acrylate-based compounds, epoxy resins, vinyl compounds excluding acrylate-based compounds, and the like can be illustrated. The number of functional groups is not particularly limited as long as it is one or more.

Examples of the acrylate-based compounds include polyurethane (meth) acrylate, polyester (meth)acrylate, epoxy (meth) acrylate, polyamide (meth)acrylate, polybutadiene (meth) acrylate, polystyryl (meth)acrylate, polycarbonate diacrylate, tripropylene glycol di(meth)acrylate, hexanediol di(meth)acrylate, trimethylolpropane tri(meth)acrylate, pentaerythritol tri(meth)acrylate, and siloxane polymers having a (meth)acryloyloxy group. Polyester (meth)acrylate, polyurethane (meth)acrylate, and epoxy poly(meth)acrylate are preferred, and polyurethane (meth)acrylate is more preferred.

There is no limit to molecular weight as long as the acrylate-based compound is dissolved in the organic-inorganic complex-forming composition. Usually, the mass average molecular weight is 500 to 50,000, preferably 1,000 to 10,000.

The epoxy (meth)acrylate can be obtained, for example, by the esterification reaction of the oxirane ring of a low molecular weight bisphenol type epoxy resin or novolac epoxy resin with acrylic acid.

The polyester (meth)acrylate is obtained, for example, by esterifying with acrylic acid the hydroxyl groups of a polyester oligomer having hydroxyl groups at both ends, obtained by the condensation of a polyvalent carboxylic acid and a polyhydric alcohol. Alternatively, the polyester (meth)acrylate is obtained by esterifying with acrylic acid a hydroxyl group at an end of an oligomer obtained by adding an alkylene oxide to a polyvalent carboxylic acid.

The urethane (meth)acrylate is the reaction product of an acrylate monomer having a hydroxyl group and an isocyanate compound obtained by reacting a polyol with a diisocyanate. Examples of the polyol include polyester polyols, polyether polyols, and polycarbonate diols.

Examples of commercial products of the urethane (meth) acrylate used in the present invention can include trade names: BEAMSET 102, 502H, 505A-6, 510, 550B, 551B, 575, 575CB, EM-90, and EM92 manufactured by Arakawa Chemical Industries, Ltd., trade names: Photomer 6008 and 6210 manufactured by SAN NOPCO LIMITED, trade names: NK Oligo U-2PPA, U-4HA, U-6HA, H-15HA, UA-32PA, U-324A, U-4H, and U-6H manufactured by Shin Nakamura Chemical Co., Ltd., trade names: ARONIX M-1100, M-1200, m-1210, M-1310, M-1600, and M-1960 manufactured by TOAGOSEI CO., LTD., trade names: AH-600, AT606, and UA-306H manufactured by Kyoeisha Chemical Co., Ltd., trade names: KAYARAD UX-2201, UX-2301, UX-3204, UX-3301, UX-4101, UX-6101, and UX-7101 manufactured by Nippon Kayaku Co., Ltd., trade names: SHIKOH UV-1700B, UV-3000B, UV-6100B, UV-6300B, UV-7000, UV-7600B, and UV-2010B manufactured by The Nippon Synthetic Chemical Industry Co., Ltd., trade names: Art Resin UN-1255, UN-5200, HDP-4T, HMP-2, UN-901T, UN-3320HA, UN-3320HB, UN-3320HC, UN-3320HS, H-61, and HDP-M20 manufactured by Negami Chemical Industrial Co., Ltd, and trade names: Ebecryl 6700, 204, 205, 220, 254, 1259, 1290K, 1748, 2002, 2220, 4833, 4842, 4866, 5129, 6602, and 8301 manufactured by Daicel-UCB Company, Ltd.

In addition, the vinyl compounds excluding acrylate-based compounds include N-vinylpyrrolidone, N-vinylcaprolactam, vinyl acetate, styrene, and unsaturated polyesters. Examples of the epoxy resins can include hydrogenated bisphenol A diglycidyl ether, 3,4-epoxycyclohexylmethyl-3, 4-epoxycyclohexane carboxylate, 2-(3,4-epoxycyclohexyl-5,5-spiro-3,4-epoxy)cyclohexane-meta-dioxane, and bis(3, 4-epoxycyclohexylmethyl)adipate.

The amount of the blended electromagnetic ray-curable compound in the solids of the organic-inorganic complex-forming composition of the present invention is 2 to 98% by mass, preferably 50 to 98% by mass, based on the total mass of the organic silicon compound and/or the condensate thereof, the silanol condensation catalyst, the electromagnetic ray-curable compound, and the metal compound particles.

(Photopolymerization Initiator)

Examples of the photopolymerization initiator of the present invention can include (a) compounds that generate a cationic species by light irradiation, and (b) compounds that generate an active radical species by light irradiation.

Preferred examples of the compounds that generate a cationic species by light irradiation can include onium salts having a structure represented by the following formula (II). The onium salts are compounds that release a Lewis acid by receiving light.

$$[R^1_a R^2_b R^3_c R^4_d W]^{+e}[ML_{e+f}]^{-e} \qquad (II)$$

(wherein the cation represents an onium ion, W represents S, Se, Te, P, As, Sb, Bi, O, I, Br, Cl, or N≡N—, $R^1$, $R^2$, $R^3$ and $R^4$ each represent the same or different organic group, a, b, c, and d each represent an integer of 0 to 3, and (a+b+c+d) is equal to the valence of W; M represents a metal or a metalloid constituting the center atom of the halide complex $[ML_{e+f}]$, for example, B, P, As, Sb, Fe, Sn, Bi, Al, Ca, In, Ti, Zn, Sc, V, Cr, Mn, or Co; and L represents a halogen atom, for example, F, Cl, or Br, e represents the net charge of the halide complex ion, and f represents the valence of M)

Specific examples of the anion $(ML_{e+f})$ in the above formula (II) can include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

In addition, onium salts having an anion represented by the formula $[ML_f(OH)^-]$ can also be used. Further, onium salts having other anions, such as a perchlorate ion ($ClO_4^-$), a trifluoromethanesulfonate ion ($CF_3SO_3^-$), a fluorosulfonate ion ($FSO_3^-$), a toluenesulfonate ion, a trinitrobenzenesulfonate ion, and a trinitrotoluenesulfonate ion, may be used. One of these can be used alone, or two or more of these can be used in combination.

Examples of the compounds that generate an active radical species by light irradiation can include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methyl-propan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, 2-benzyl-2-dimethy-lamino-1-(4-morpholinophenyl)-butanone-1,4-(2-hydroxyethoxy)phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, and oligo(2-hydroxy-2-methyl-1-(4-(1-methylvinyl)phenyl) propanone).

The amount of the photopolymerization initiator used in the present invention is preferably 0.01 to 20% by mass, further preferably 0.1 to 10% by mass, based on the solids of the (meth)acrylate-based electromagnetic ray-curable compound.

In the present invention, a sensitizer can be added as required. For example, trimethylamine, methyldimethanolamine, triethanolamine, p-dimethylaminoacetophenone, ethyl p-dimethylaminobenzoate, isoamyl p-dimethylaminobenzoate, N,N-dimethylbenzylamine, and 4,4'-bis(diethylamino)benzophenone can be used.

(Metal Compound Particles)

The metal compound particles of the present invention is a mixture of metal compound particles having an isoelectric point of less than 5 as a metal oxide and metal compound particles having an isoelectric point of 5 or more as a metal oxide.

Examples of the metal of the metal compound particles having an isoelectric point of less than 5 as a metal oxide include silicon, tungsten, and antimony. Examples of the metal compound include metal oxides, such as silica, tungsten oxide, and antimony oxide.

On the other hand, examples of the metal of the metal compound particles having an isoelectric point of 5 or more as a metal oxide include zirconium, aluminum, titanium, magnesium, iron, tin, zinc, cadmium, nickel, copper, berylium, ruthenium, thorium, yttrium, mercury, cesium, chromium, and lanthanum. Examples of the metal compound include metal oxides, such as zirconia, alumina, titania, magnesium oxide, tin oxide, zinc oxide, cadmium oxide, yttrium oxide, nickel oxide, copper oxide, berylium oxide, ruthenium oxide, thorium oxide, mercury oxide, cerium oxide, and chromium oxide, and magnesium fluoride.

The metal compound particles are preferably a mixed sol of silica and at least one selected from zirconia, alumina, and titania, more preferably a mixed sol of a silica sol and a zirconia sol.

The mixing proportion of the metal compound particles having an isoelectric point of less than 5 as a metal oxide to the metal compound particles having an isoelectric point of 5 or more is 1:99 to 99:1, preferably 50:50 to 99:1, and more preferably 80:20 to 99:1, in terms of the weight ratio of the solids.

The metal compound particles used are not particularly limited whether they are secondary particles or primary particles. The metal compound particles are preferably primary particles.

The particle diameter of the metal compound is not particularly limited. The average primary particle diameter is preferably in the range of 1 nm to 100 nm, further preferably in the range of 1 nm to 50 nm.

In addition, the properties and state of the metal compound particles may be a sol or a powder, and usually, a sol is preferably used. A sol is usually a colloidal dispersion solution, and therefore, a uniform dispersion solution can be easily made by simply mixing the sol with another component. In addition, the problem of becoming nonuniform due to settling or the like is a little.

In addition, metal compound particles whose surface is surface-modified with a silane coupling agent or the like can be used. Specifically, a silica sol or the like subjected to hydrophobic treatment with hydrocarbon groups or the like can be illustrated.

The amount of the blended metal compound particles in the solids of the organic-inorganic complex-forming composition of the present invention is 0.1 to 50% by mass, preferably 0.1 to 25% by mass, based on the total mass of the organic silicon compound and/or the condensate thereof, the silanol condensation catalyst, the electromagnetic ray-curable compound, and the metal compound particles.

(Other Components that can be Contained)

The solvent used in the present invention is not particularly limited. Examples of the solvent include aromatic hydrocarbons, such as benzene, toluene, and xylene; aliphatic hydrocarbons, such as hexane and octane; alicyclic hydrocarbons, such as cyclohexane and cyclopentane; ketones, such as acetone, methyl ethyl ketone, and cyclohexanone; ethers, such as tetrahydrofuran and dioxane; esters, such as ethyl acetate and butyl acetate; amides, such as N,N-dimethylformamide and N,N-dimethylacetamide; sulfoxides, such as dimethyl sulfoxide; alcohols, such as methanol and ethanol; and polyhydric alcohol derivatives, such as ethylene glycol monomethyl ether and ethylene glycol monomethyl ether acetate. One of these solvents can be used alone, or two or more of these solvents can be used in combination.

In addition, it is also possible to separately add and disperse a filler in the organic-inorganic complex-forming composition of the present invention in order to exhibit properties, such as the coloration of the obtained coating film, film thickening, the prevention of the transmission of ultraviolet rays to the base, the provision of anticorrosiveness, and heat resistance.

Examples of this filler include water-insoluble pigments, such as organic pigments and inorganic pigments, or particulate, fibrous, or scaly metals and alloys and oxides, hydroxides, carbides, nitrides, and sulfides thereof other than pigments. Specific examples of this filler can include particulate, fibrous, or scaly iron, copper, aluminum, nickel, silver, zinc, ferrite, carbon black, stainless steel, silicon dioxide, titanium oxide, aluminum oxide, chromium oxide, manganese oxide, iron oxide, zirconium oxide, cobalt oxide, synthetic mullite, aluminum hydroxide, iron hydroxide, silicon carbide, silicon nitride, boron nitride, clay, diatomaceous earth, slaked lime, gypsum, talc, barium carbonate, calcium carbonate, magnesium carbonate, barium sulfate, bentonite, mica, zinc green, chromium green, cobalt green, viridian, guinea green, cobalt chromium green, Scheele's green, green earth, manganese green, pigment green, ultramarine blue, Prussian blue, blue verditer, cobalt blue, cerulean blue, copper borate, molybdenum blue, copper sulfide, cobalt violet, Mars violet, manganese violet, pigment violet, lead suboxide, calcium plumbate, zinc yellow, lead sulfide, chromium yellow, ocher, cadmium yellow, strontium yellow, titanium yellow, litharge, pigment yellow, cuprous oxide, cadmium red, selenium red, chromium vermilion, red oxide, zinc white, antimony white, basic lead sulfate, titanium white, lithopone, lead silicate, zircon oxide, tungsten white, lead flowers of zinc, Bantison white, lead phthalate, manganese white, lead sulfate, graphite, bone black, diamond black, thermatomic black, vegetable black, potassium titanate whiskers, and molybdenum disulfide.

In addition, additives, such as known dehydrators, such as methyl orthoformate, methyl orthoacetate, and tetraethoxysilane, various surfactants, and silane coupling agents, titanium coupling agents, dyes, dispersing agents, thickening agents, and leveling agents other than the above can also be added to the organic-inorganic complex-forming composition of the present invention.

(Method for Preparing Organic-Inorganic Complex-Forming Composition)

As a method for preparing the organic-inorganic complex-forming composition of the present invention, an organic silicon compound, a silanol condensation catalyst, an electromagnetic ray-curable compound, and metal compound particles are mixed, with water and/or a solvent added as required.

Specifically, for example, a silanol condensation catalyst, such as a photosensitive compound, is mixed with a solvent, a predetermined amount of water is added for (partial) hydrolysis, and then, an organic silicon compound is added for (partial) hydrolysis. On the other hand, an electromagnetic ray-curable compound is dissolved in a solvent, a photopolymerization initiator is added, and then, both solutions are mixed.

These four components can also be simultaneously mixed. In addition, examples of the method for mixing the organic silicon compound and the silanol condensation catalyst can include a method of mixing the organic silicon compound and the silanol condensation catalyst and then adding water for (partial) hydrolysis, and a method of mixing (partial) hydrolysates obtained by separately (partially) hydrolyzing the organic silicon compound and the silanol condensation catalyst. It is not always necessary to add water or a solvent, but it is preferred to add water to provide a (partial) hydrolysate. Although the amount of the predetermined amount of water depends on the type of the silanol condensation catalyst, for example, when the silanol condensation catalyst is a metal compound having two or more hydroxyl groups or hydrolyzable groups, 0.5 moles or more of water is preferably used, and 0.5 to 2 moles of water is more preferably used, based on 1 mole of the metal compound. In addition, when the silanol condensation catalyst is a metal chelate compound or an organic acid metal salt compound, 5 to 100 moles of water is preferably used, and 5 to 20 moles of water is more preferably used, based on 1 mole of the metal chelate compound or the organic acid metal salt compound.

Metal compound particles can be added at the end of the above step. Specifically, for example, the particles may be directly added to the solution prepared in the above step, or after being dispersed in an organic solvent, such as an alcohol. After the addition, the mixture can be stirred to provide the organic-inorganic complex-forming composition of the present invention.

(Application of Organic-Inorganic Complex-Forming Composition)

Examples of substrates on which the organic-inorganic complex of the present invention can be formed include metals, ceramics, glass, and plastics. Among these, preferred examples include plastics, and specific examples include plastic substrates for touch panels. Conventionally, the formation of a thin film on a plastic substrate has been difficult, and the substrates have been limited to inorganic substrates, such as glass. But, the thin film of the present invention can be easily formed as a coating even on plastic substrates on which it is difficult to form a thin film, and the thin film of the present invention is also suitable for plastic optical components. Examples of such plastics include polycarbonate resins, acrylic resins, polyimide resins, polyester resins, epoxy resins, liquid crystal polymer resins, and polyethersulfones.

In addition, as a method for applying the organic-inorganic complex-forming composition, known application methods can be used. Examples of the method can include dipping methods, spraying methods, bar coating methods, roll coating methods, spin coating methods, curtain coating methods, gravure printing methods, silk screen methods, and ink jet methods. In addition, the thickness of the formed film is not particularly limited, and is, for example, about 0.05 to 200 μm.

The drying treatment of the film formed by applying the organic-inorganic complex-forming composition is, for example, preferably performed at 40 to 200° C. for about 1 to 120 minutes, more preferably at 60 to 120° C. for about 10 to 60 minutes.

(Method for Producing Organic-Inorganic Complex)

Examples of a method for producing the organic-inorganic complex of the present invention can include a method of irradiating the above organic-inorganic complex-forming composition with light including a wavelength of 350 nm or less.

The irradiation with light including a wavelength of 350 nm or less can be performed using, for example, a known apparatus, such as a high pressure mercury lamp, a low pressure mercury lamp, a metal halide lamp, or an excimer lamp. The light for irradiation is preferably light comprising light having any wavelength in the range of 150 to 350 nm as the main component, more preferably light comprising light having any wavelength in the range of 250 to 310 nm as the main component. Materials that are sensitive to wavelengths in such a range and do not react to light of more than 350 nm, preferably 310 nm, are hardly affected by sunlight. In addition, the amount of irradiation light of light for irradiation is, for example, about 0.1 to 100 J/cm$^2$, and is preferably about 0.2 to 20 J/cm$^2$, more preferably about 0.5 to 10 J/cm$^2$, considering film curing efficiency (the relationship between irradiation energy and the extent of film curing).

The irradiation with light having a wavelength of 350 nm or less refers to irradiation using a source of light comprising light having any wavelength of 350 nm or less as a component, preferably, irradiation using a source of light comprising light having any wavelength of 350 nm or less as the main component, that is, irradiation using a source of light in which the wavelength of a component in the largest amount is 350 nm or less.

(Organic-Inorganic Complex)

The organic-inorganic complex of the present invention comprises:

a) a condensate of at least one organic silicon compound represented by formula (I):

$R_n SiX_{4-n}$ (I)

(wherein R represents an organic group having a carbon atom directly bonded to Si, and X represents a hydroxyl group or a hydrolyzable group; and n represents 1 or 2, R may be the same or different when n is 2, and X may be the same or different when (4−n) is 2 or more);

b) a silanol condensation catalyst;

c) a cured product of an electromagnetic ray-curable compound; and d) aggregates of metal compound particles that are a mixture of metal compound particles having an isoelectric point of less than 5 as a metal oxide and metal compound particles having an isoelectric point of 5 or more as a metal oxide.

The organic silicon compound or the condensate thereof, the electromagnetic ray-curable compound, and the metal compound particles in the organic-inorganic complex-forming composition that is the raw material become the condensate of the organic silicon compound, a cured product of the electromagnetic ray-curable compound, and aggregates of the metal compound particles, respectively, in the organic-inorganic complex. When the metal compound particles in the organic-inorganic complex-forming composition are a sol, such as a silica sol or titania sol, they become a gel in the organic-inorganic complex.

The content of the above components is similar to the blending proportion of the components in the solids of the organic-inorganic complex-forming composition.

The organic-inorganic complex of the present invention the organic-inorganic complex of the present invention contains metal compound particles, and therefore, its surface is not smooth and has unevenness. In addition, the haze factor is 5% or less, preferably 2.0% or less, and further preferably 1.5% or less.

In the present invention, the haze factor indicates the proportion of scattered light to total transmitted light. A lower haze factor indicates being more transparent.

The haze factor of the coating film can be measured using a haze meter (manufactured by Nippon. Denshoku Industries Co., Ltd.).

The organic-inorganic complex of the present invention encompasses those in which a silanol condensation catalyst, such as a photosensitive compound and/or a derivative thereof, is dispersed in a non-bonded state in a condensate of an organic silicon compound, those in which a silanol condensation catalyst, such as a photosensitive compound and/or a derivative thereof, is bonded to a condensate of an organic silicon compound (for example, those having a Si—O-M bond (M represents a metal atom in a silanol condensation catalyst, such as a photosensitive compound)), and those consisting of a mixed state thereof.

The silanol catalyst of the present invention indicates one similar to the silanol catalyst in the organic-inorganic complex-forming composition described above.

EXAMPLES

The present invention will be more specifically described below by Examples, but the technical scope of the present invention is not limited to these illustrations.

Example 1

1. Synthesis of Silanol Condensation Catalyst (Photosensitive Compound)

15.9 g of titanium diisopropoxybisacetylacetonate (the amount of solids in terms of titanium oxide: 16.5% by weight) was dissolved in 30.7 g of a mixed solvent of ethanol/a lower alcohol/water=86:13.8:0.2, and then, 5.9 g (10 times moles/ the moles of titanium oxide) of ion-exchange water was added with stirring. This solution was stirred for 2 hours, while being heated to 40° C., for hydrolysis. Next, the solution was filtered to obtain a yellow transparent nanodispersion solution of titanium oxide having a concentration of 5% by weight in terms of titanium oxide [A-1]. The titanium oxide had an average particle diameter of 4.1 nm, and was monodisperse.

2. Adjustment of Organic Silicon Compound

As an organic silicon compound, a liquid [C-1] obtained by mixing 30.7 g of vinyltrimethoxysilane [B-1] and 32.0 g of 3-methacryloxypropyltrimethoxysilane [B-2] ([B-1]/[B-2] =70/30: molar ratio) was used.

Next, a liquid [D-1] was made by mixing 52.5 g of [A-1] and 52.7 g of [C-1] at an element ratio (Ti/Si=1/9), further adding 10.7 g (2 times moles/the moles of the organic silicon compound) of ion-exchange water, heating the solution to 70° C., and stirring the solution for 3 hours.

3. Adjustment of Electromagnetic-Ray Curable Compound Solution

As an ultraviolet-curable compound, 55% by mass of an urethane acrylate oligomer [E-1] as solids was used. 2-Methyl-1-(4-methylthiophenyl)-2-morpholinopropan-1-one as a photopolymerization initiator was added to this solution in an amount of 4% by mass based on the solids of the urethane acrylate oligomer to make a solution [F-1].

4. Adjustment of Organic-Inorganic Complex-Forming Composition 116 g of the above liquid [D-1] and 584 g of the liquid [F-1] were mixed so that the proportion of the solids was [D-1]/[E-1]=10/90 in terms of mass ratio, to make a coating film-forming solution [G-1].

5. Addition of Metal Oxides

A mixed sol of a silica sol (average primary particle diameter: 50 nm)/a zirconia sol (average particle diameter: 50 nm)=85/15 (mass ratio), as metal oxides, was added in the proportion of 7.5% by mass as the amount of solids to the solids of [G-1], and dispersed to make [H-1].

Example 2

A mixed sol of a silica sol (average primary particle diameter: 100 nm)/a zirconia sol (average particle diameter: 50 nm)=85/15 (mass ratio) was added in the proportion of 7.5% by mass as the amount of solids to the solids of the above [G-1] to make [H-2].

Example 3 to Example 6

A mixed sol of a silica sol (average primary particle diameter: 50 nm)/a zirconia sol (average primary particle diameter: 20 nm)=70/30 (weight ratio), as metal oxides, was added in proportions shown in Table 1, as the amount of solids, to the solids of [G-1], and dispersed to make [H-3] to [H-6].

TABLE 1

|  |  | Amount added (% by mass) |
|---|---|---|
| Example 3 | H-3 | 2.5 |
| Example 4 | H-4 | 5.0 |
| Example 5 | H-5 | 7.5 |
| Example 6 | H-6 | 10.0 |

Comparative Example 1

A silica sol (average primary particle system: 50 nm) was added in the proportion of 7.5% by mass as the amount of solids to the solids of the above [G-1] to make [RH-1].

Comparative Example 2

A zirconia sol (average particle diameter: 50 nm) was added in the proportion of 7.5% by mass as the amount of solids to the solids of the above [G-1] to make [RH-2].

Test Example A

A-1. Coating Film Formation

The coating film-forming compositions [H-1] to [H-2], and [RH-1] to [RH-2] were formed into films on 188 μm thick PET films (products of Toray Industries Inc., anti-interference fringe PET, Lumirror U48) by a bar coater (No. 10), and heated at 60° C. by a warm air circulation type dryer for 3 minutes. Then, the films were irradiated with ultraviolet rays in an accumulated amount of irradiation of 400 mJ/cm$^2$ by a condensing type high pressure mercury lamp (UV light comprising light having wavelengths of 365 nm, 313 nm, and 254 nm as the main component, manufactured by EYE GRAPHICS CO., LTD., one lamp type, 120 W/cm, lamp height: 9.8 cm, conveyor speed: 6 m/min) to obtain thin films [I-1] to [I-2], and [RI-1] to [RI-2].

The coating film-forming compositions [H-3] to [H-6] were formed into films on 188 μm thick PET films (anti-interference fringe PET, Lumirror U48 manufactured by Toray Industries Inc. and COSMOSHINE 4300 manufactured by Toyobo Co., Ltd.) by a bar coater (No. 10), and heated at 80° C. by a warm air circulation type dryer for 3 minutes. Then, the films were irradiated with ultraviolet rays in an accumulated amount of irradiation of 400 mJ/cm$^2$ by a condensing type high pressure mercury lamp (UV light comprising light having wavelengths of 365 nm, 313 nm, and 254 nm as the main component, manufactured by EYE GRAPHICS CO., LTD., one lamp type, 120 W/cm, lamp height: 9.8 cm, conveyor speed: 6 m/min) to obtain thin films [I-3] to [I-10].

A-2. Haze Factor

The haze factor of the coating film was measured using a haze meter (manufactured by Nippon Denshoku Industries Co., Ltd.).

A-3. Anti-Newton Ring Performance

The PET film on which the film was formed was bonded so that the coated surface faced a glass substrate, and the PET film was pressed by fingers from the uncoated surface side, and adhered. This portion was observed under a three-wavelength type fluorescent lamp, and evaluated as follows.
Very Good . . . No Newton rings occur Good . . . To the extent that Newton rings can be slightly recognized when looked at closely and carefully
Fair . . . Better than Poor, but not to the extent of Good
Poor . . . Newton rings can be easily recognized

A-4. Glare Prevention Performance

The PET film on which the film was formed was bonded so that the coated surface faced a display (resolution: one pixel 152 μm), adhered, and evaluated as follows.
Good . . . No glare occurs
Fair . . . Better than Poor, but not to the extent of Good
Poor Glare can be easily recognized
The test results are shown in the following Table 2.

TABLE 2

| Thin film | Coating film-forming composition | Coated film | Haze factor (%) | Total light transmittance (%) | Anti-Newton ring properties | Glare prevention properties |
|---|---|---|---|---|---|---|
| I-1 | H-1 | A | 1.12 | 91.79 | Good | Good |
| I-2 | H-2 | A | 1.37 | 91.59 | Good | Good |
| I-3 | H-3 | A | 1.06 | 91.66 | Fair | Good |
| I-4 | H-4 | A | 1.87 | 91.13 | Very Good | Good |
| I-5 | H-5 | A | 3.28 | 90.52 | Very Good | Good |

TABLE 2-continued

| Thin film | Coating film-forming composition | Coated film | Haze factor (%) | Total light transmittance (%) | Anti-Newton ring properties | Glare prevention properties |
|---|---|---|---|---|---|---|
| I-6 | H-6 | A | 4.92 | 90.19 | Very Good | Good |
| I-7 | H-3 | B | 1.06 | 91.66 | Fair | Good |
| I-8 | H-4 | B | 1.87 | 91.13 | Very Good | Good |
| I-9 | H-5 | B | 3.28 | 90.52 | Very Good | Good |
| I-10 | H-6 | B | 4.92 | 90.19 | Very Good | Good |
| RI-1 | | | 1.61 | A 1.61 | 89.83 | Poor | Good |
| RI-2 | | | 5.33 | A 5.33 | 90.34 | Good | Poor |

A: Lumirror U48
B: COSMOSHINE 4300

INDUSTRIAL APPLICABILITY

The present invention can provide an organic-inorganic complex in which the surface has very high hardness and the inside and the back surface side have appropriate hardness and which has excellent adhesiveness to a substrate and excellent moisture resistance, the organic-inorganic complex having anti-Newton ring properties and a low haze factor and preventing glare. Further, the organic-inorganic complex of the present invention can also be provided with anti-glare properties by increasing the amount of metal compound particles added.

The organic-inorganic complex of the present invention has excellent interlayer adhesiveness when various films are laminated, because the surface has a $SiO_2$-like structure having high polarity. The organic-inorganic complex of the present invention can also be surface-treated by silane coupling treatment, and the surface is changed to be water repellent and oil repellent, and amino groups are introduced to provide plating adhesiveness. Various treatments are easy. In addition, the slip properties of the surface are good because of surface unevenness due to the metal compound particles, and slip properties and water repellency and oil repellency can both be achieved. Therefore, the organic-inorganic complex of the present invention can be preferably used, for example, for a touch panel surface.

Further, the organic-inorganic complex of the present invention has the property of good moisture resistance. Generally, it is considered that when metal compound particles are added to a hard coating film, the moisture resistance is poor. But, the organic-inorganic complex of the present invention shows good moisture resistance though it contains metal compound particles.

In addition, in the mixture of metal compound particles of the present invention, the different types of metal compound particles are charged differently, positively and negatively, and form clusters (aggregates) due to an electrostatic effect. As a result, even particles having a particle diameter equal to or less than the wavelength of visible light exhibit anti-Newton ring properties, glare prevention, and further anti-glare properties by forming aggregates.

The invention claimed is:

1. An organic-inorganic complex-forming composition comprising:
   a) at least one organic silicon compound represented by formula (I) and/or a condensate thereof:

$$R_nSiX_{4-n} \quad (I)$$

wherein:
   R represents an organic group having a carbon atom directly bonded to Si;
   X represents a hydroxyl group or a hydrolyzable group;
   n represents 1 or 2;
   R may be the same or different when n is 2; and
   each X may be the same or different when (4−n) is 2 or more;
   b) a silanol condensation catalyst;
   c) an electromagnetic ray-curable compound; and
   d) metal compound particles that are a mixture of metal compound particles having an isoelectric point of less than 5 as a metal oxide and metal compound particles having an isoelectric point of 5 or more as a metal oxide, wherein a mixing proportion of the metal compound particles having an isoelectric point of less than 5 as a metal oxide to the metal compound particles having an isoelectric point of 5 or more as a metal oxide is 50:50 to 99:1;
   wherein:
   the metal compound particles having an isoelectric point of less than 5 as a metal oxide and the metal compound particles having an isoelectric point of 5 or more as a metal oxide are primary particles, the primary particles having an average primary particle diameter in a range of 1 nm to 100 nm;
   a metal of the metal compound particles having an isoelectric point of 5 or more as a metal oxide is at least one selected from the group consisting of Zr, Al, Ti, and Mg; and
   an amount of the electromagnetic ray-curable compound is 50 to 98% by mass based on a total mass of the organic silicon compound and/or the condensate thereof, the silanol condensation catalyst, the electromagnetic ray-curable compound, and the metal compound particles.

2. The organic-inorganic complex-forming composition according to claim 1, wherein the silanol condensation catalyst is at least one photosensitive compound sensitive to light having a wavelength of 350 nm or less, selected from the group consisting of metal chelate compounds, organic acid metal salt compounds, metal compounds having two or more hydroxyl groups or hydrolyzable groups, hydrolysates thereof, condensates thereof, and compounds derived therefrom.

3. The organic-inorganic complex-forming composition according to claim 2, wherein a metal in the silanol condensation catalyst is at least one selected from the group consisting of Ti, Al, Zr, and Sn.

4. The organic-inorganic complex-forming composition according to claim 1, wherein a metal of the metal compound particles having an isoelectric point of less than 5 as a metal oxide is silicon.

5. The organic-inorganic complex-forming composition according to claim 1, wherein the metal compound particles are in a sol state.

6. An organic-inorganic complex comprising:
   a) a condensate of at least one organic silicon compound represented by formula (I):

$$R_nSiX_{4-n} \quad (I)$$

wherein:
   R represents an organic group having a carbon atom directly bonded to Si;
   X represents a hydroxyl group or a hydrolyzable group;
   n represents 1 or 2;
   R may be the same or different when n is 2; and
   each X may be the same or different when (4−n) is 2 or more;
   b) a silanol condensation catalyst;

c) a cured product of an electromagnetic ray-curable compound; and
d) an aggregate of metal compound particles that are a mixture of metal compound particles having an isoelectric point of less than 5 as a metal oxide and metal compound particles having an isoelectric point of 5 or more as a metal oxide, wherein a mixing proportion of the metal compound particles having an isoelectric point of less than 5 as a metal oxide to the metal compound particles having an isoelectric point of 5 or more as a metal oxide is 50:50 to 99:1;

wherein:

the metal compound particles having an isoelectric point of less than 5 as a metal oxide and the metal compound particles having an isoelectric point of 5 or more as a metal oxide are primary particles, the primary particles having an average primary particle diameter in a range of 1 nm to 100 nm;

a metal of the metal compound particles having an isoelectric point of 5 or more as a metal oxide is at least one selected from the group consisting of Zr, Al, Ti, and Mg; and an amount of the cured product of the electromagnetic ray-curable compound is 50 to 98% by mass based on a total mass of the condensate of the organic silicon compound, the silanol condensation catalyst, the cured product of the electromagnetic ray-curable compound, and the metal compound particles.

7. The organic-inorganic complex according to claim 6, wherein the silanol condensation catalyst is at least one photosensitive compound sensitive to light having a wavelength of 350 nm or less, selected from the group consisting of metal chelate compounds, organic acid metal salt compounds, metal compounds having two or more hydroxyl groups or hydrolyzable groups, hydrolysates thereof, condensates thereof, and compounds derived therefrom.

8. The organic-inorganic complex according to claim 7, wherein a metal in the silanol condensation catalyst is at least one selected from the group consisting of Ti, Al, Zr, and Sn.

9. The organic-inorganic complex according to claim 6, wherein a metal of the metal compound fine particles having an isoelectric point of less than 5 as a metal oxide is silicon.

10. The organic-inorganic complex according to claim 6, wherein the complex has a haze factor of 5% or less when formed on a substrate.

11. A laminate obtained by applying the organic-inorganic complex-forming composition according to claim 1 to a substrate.

* * * * *